C. C. McCOLLY.
WAGON END GATE.
APPLICATION FILED FEB. 4, 1911.
1,013,035.
Patented Dec. 26, 1911.
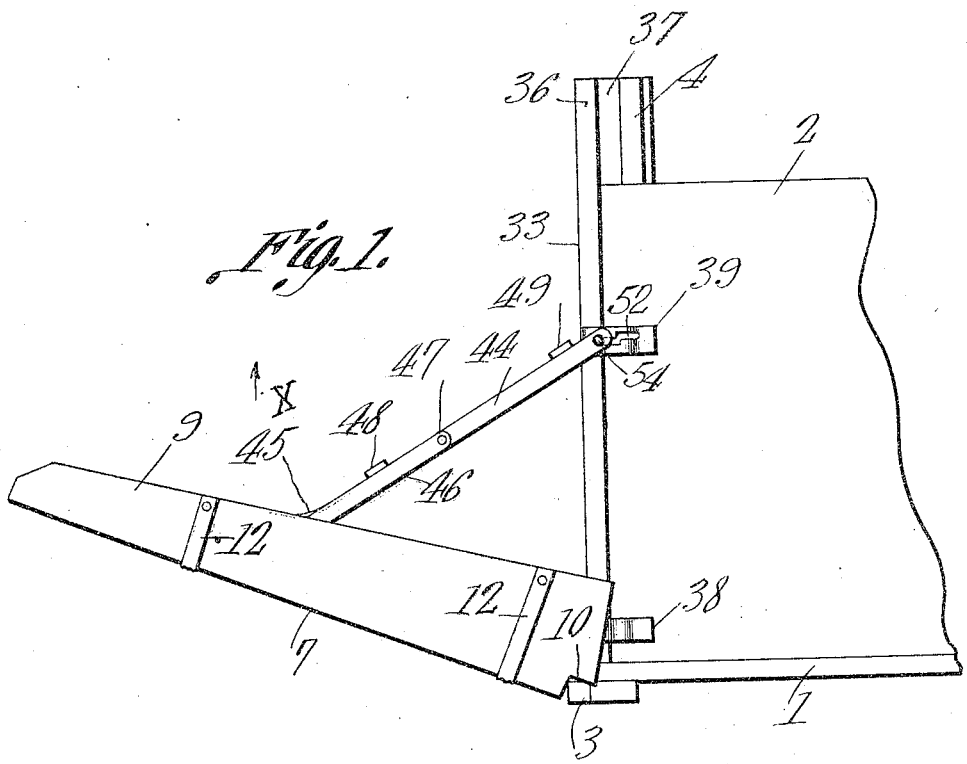
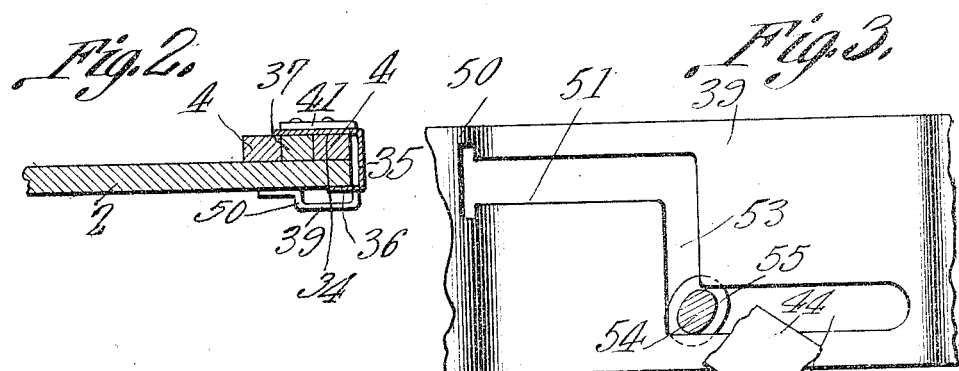
C. C. McColly, Inventor

UNITED STATES PATENT OFFICE.

CHARLES C. McCOLLY, OF ROCKY FORD, COLORADO.

WAGON END-GATE.

1,013,035.     Specification of Letters Patent.     Patented Dec. 26, 1911.

Application filed February 4, 1911. Serial No. 606,595.

*To all whom it may concern:*

Be it known that I, CHARLES C. Mc-COLLY, a citizen of the United States, residing at Rocky Ford, in the county of Otero and State of Colorado, have invented a new and useful Wagon End-Gate, of which the following is a specification.

It is the object of this invention to provide novel means for connecting an end gate with a vehicle body.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 is a side elevation, the end gate being let down for use as a shoveling board; Fig. 2 is a fragmental horizontal section through one end of a side board and its attendant parts; and Fig. 3 is a plan of one of the guides, the view being diagrammatic in nature.

In the drawings, the bottom of a wagon box is shown, and denoted generally by the numeral 1.

The numeral 2 indicates the side boards of the wagon box, the numeral 3 the sill, and the numeral 4 the cleats upon the adjacent inner faces of the side boards 2, between which cleats the end board is retained, in the common and well known manner.

The combined end gate and shoveling board denoted generally by the numeral 7, is equipped with sides 9 which serve to prevent the grain from sliding laterally off the shoveling board, when the same is positioned as shown in Fig. 1. The sides 9 are notched as shown at 10, adjacent their inner ends, these notches 10 being adapted to receive the outstanding extremities of the sill 3, a pivotal mounting for the shoveling board being thus effected, as Fig. 1 will render evident. Straps extend across the sides 9 as denoted by the numeral 12, and as seen most clearly in Fig. 1. These straps 12 serve to reinforce the upstanding sides 9 of the shoveling board.

The invention further includes a pair of angle members 33, one flange of each of the angle members 33 overlapping the inner faces of the cleats 4, as shown at 34. The angle member 33 is extended across the edges of the cleats 4 and across the edges of the side boards 2, as shown at 35, the other flange 36 of each angle member 33 overlapping the side boards 2 upon the outside of the wagon box. To the flanges 34, upright tongues 37 are secured, these tongues registering slidably between the cleats 4. It will be seen that the angle members 33 together with the tongues 37, may be readily lifted upwardly, out of engagement with the wagon box, the construction being such that the angle members may readily be mounted upon a wagon box of ordinary construction. The invention further includes guides 38 and 39, projecting beyond the flange 36, and overlapping the side boards 2 of the wagon box, these guides 38 and 39 being carried through the flanges 34 and 36 of the angle members 33, behind the portion 35 of the said angle members, so that the guides, at their inner ends overlap the flanges 34, as shown at 41. The invention further includes a pair of operating levers 44, curved adjacent one end, for convenient manipulation, as shown at 45. These operating levers 44 are pivotally connected with the guides 39, in a manner to be described hereinafter. To the intermediate portions of the operating levers 44, links 46 are pivoted as shown at 47, the outer ends of the links 46 being pivotally connected with the sides 9 of the board 7. When, as shown in Fig. 1, the operating levers 44 and the links 46 are in alinement, the shoveling board will be suspended in inclined position. Stops 48 outstanding from the operating levers 44, engage the upper edges of the links, thus to maintain the links and the levers in alinement, as seen in Fig. 1.

Noting Fig. 1, the curved ends 45 of the operating levers 44 may be seized, the free ends of the operating levers swinging upwardly, in the direction of the arrow X, and revolving around the members 39 as a center, until the curved ends 45 of operating levers are in the depending position, the operating levers 44 and the links 46 being vertically alined, the lower extremities of the levers 44 abutting against the rear faces of the outstanding ends of the sill 3.

The manner in which the operating levers 44 are pivotally connected with the members 39 is as follows. It will be noted that the members 39 are bent, as shown at 50. In each of the members 39 there is a longitudinally disposed slot, consisting of parallel portions 51 and 52, connected by a rectangularly disposed portion 53. The portion 51 of the slot is extended into the bent section 50. Each operating lever 44 is supplied with an outstanding stud 54, equipped with a head 55, adapted to engage the inner face of the member 39, the stud 54 moving pivotally in the slot. This stud 54 is elliptical in transverse section. The width of the portions 51 and 52 of the slot is substantially equal to the major axis of the cross sectional ellipse of the stud 54, while the width of the transversely disposed portion 53 of the slot is approximately equal to the minor axis of the cross sectional ellipse of the stud.

By referring to Fig. 3, it will be seen that when the operating lever 44 is elevated into a horizontal position, the stud 54 will be rotated until its minor axis is at right angles to the direction in which the portion 53 of the slot extends. Under such circumstances, the stud may be removed from the slot, the stud traversing in order, the portions 52, 53 and 51 of the slot, and passing outwardly through the slot in the bent portion 50 of the member 39. When the operating levers 44 are in the inclined positions shown in Fig. 4, the levers cannot be accidentally displaced from the guides 39, a separation of the levers from the guides being possible only when the levers 44 are horizontally disposed.

The shoveling board may readily be removed from the angle members 33, by elevating the operating levers 44 into a horizontal position and then pushing them rearwardly, as hereinbefore described.

The angle members 33 may readily be slid upwardly for removal, and in such case the wagon box will be adapted to receive an end gate or tail board of the common construction; it being obvious from the foregoing that no alteration of the wagon box, as commonly constructed, is necessary in order to receive the combined end gate and shoveling board above described.

Having thus described the invention, what is claimed is:—

1. In a device of the class described, a plate provided with a slot consisting of angularly disposed parts, one of which parts is wider than the other; and a suspension member having a stud of unequal transverse dimensions, adapted to move in the slot, the major dimension of the stud being substantially equal to the width of the wider portion of the slot, and the minor dimension of the stud being substantially equal to the width of the narrower portion of the slot, there being an opening adjacent one end of the narrower portion of the slot, through which opening the stud may pass, to separate the suspension member from the plate, the stud having a projection adapted to engage behind the plate.

2. In a device of the class described, a plate provided with a slot consisting of end portions and an angularly disposed intermediate portion, the end portions of the slot being of a common width, and the intermediate portion of the slot being narrower than the end portions, one end portion of the slot having a transverse enlargement, and the plate being curved adjacent said enlargement; and a suspension member having a stud of unequal transverse dimensions, adapted to move in the slots, the major dimensions of the stud being substantially equal to the width of the wider portions of the slot, and the minor dimension of the stud being substantially equal to the width of the intermediate portion of the slot; the stud being provided with a projection adapted to engage behind the plate, the projection being movable through the enlargement, to permit a separation of the suspension member from the plate.

3. In a device of the class described, a supporting structure; plates secured thereto and provided with slots consisting of parallel parts and a rectangularly disposed part of less width than the parallel parts; an end gate; and a foldable connection between the end gate and the supporting structure, said connection being provided with elliptical studs movable in the slots, the major axis of the studs being substantially equal to the width of the parallel portions of the slots, and the minor axis of the studs being substantially equal to the width of the rectangularly disposed portions of the slots.

In testimony that I claim the foregoing as my own, I have hereto affixed my signature in the presence of two witnesses.

CHARLES C. McCOLLY.

Witnesses:
 CHARLES E. POND,
 JOSIAH McCOLLY.